US009689389B2

(12) United States Patent
Fritts et al.

(10) Patent No.: US 9,689,389 B2
(45) Date of Patent: Jun. 27, 2017

(54) SHAFT SEAL FOR AN OPEN-DRIVE COMPRESSOR

(71) Applicant: THERMO KING CORPORATION, Minneapolis, MN (US)

(72) Inventors: Ryan Michael Fritts, Maple Grove, MN (US); Timothy James Ourada, Burnsville, MN (US); Troy Wozniak, Prior Lake, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 14/777,312

(22) PCT Filed: Mar. 14, 2014

(86) PCT No.: PCT/US2014/029101
§ 371 (c)(1),
(2) Date: Sep. 15, 2015

(87) PCT Pub. No.: WO2014/144617
PCT Pub. Date: Sep. 18, 2014

(65) Prior Publication Data
US 2016/0040668 A1    Feb. 11, 2016

Related U.S. Application Data

(60) Provisional application No. 61/787,736, filed on Mar. 15, 2013.

(51) Int. Cl.
*F16J 15/16*    (2006.01)
*F04B 39/00*    (2006.01)
(Continued)

(52) U.S. Cl.
CPC .......... *F04C 27/009* (2013.01); *F01C 19/005* (2013.01); *F04B 39/04* (2013.01);
(Continued)

(58) Field of Classification Search
CPC ...... F16J 15/34; F16J 15/3404; F04C 27/009; F01C 19/005; F04B 39/04; F04B 39/041
See application file for complete search history.

(56) References Cited

U.S. PATENT DOCUMENTS 1,945,219 A    1/1934 Edgar
2,284,465 A    5/1942 Wood
(Continued)

FOREIGN PATENT DOCUMENTS

| CN | 1499077 | 5/2004 |
|---|---|---|
| CN | 202348616 | 7/2012 |
| EP | 0884478 | 12/1998 |

OTHER PUBLICATIONS

International Search Report and Written Opinion for International Application No. PCT/US2014/029101, Dated Jul. 21, 2014, 15 pgs.
(Continued)

*Primary Examiner* — Gilbert Lee
(74) *Attorney, Agent, or Firm* — Hamre, Schumann, Mueller & Larson, P.C.

(57) ABSTRACT

Devices and methods for maintaining lubrication of a shaft seal of an open-drive compressor that is operating in a vacuum condition. The external side of the shaft seal allows retention of a volume of lubricant for extending the lifespan of the shaft seal for the open-drive compressor. The devices can also reduce and/or prevent deterioration of the shaft seal regardless of the operation condition of the open-drive compressor. The devices can further reduce and/or prevent leakage of a lubricant and/or refrigerant that can cause deterioration of components within a transport refrigeration unit (TRU).

20 Claims, 9 Drawing Sheets

(51) Int. Cl.
    *F04C 27/00*     (2006.01)
    *F01C 19/00*     (2006.01)
    *F04B 39/04*     (2006.01)
    *F04C 29/04*     (2006.01)
    *F16J 15/34*     (2006.01)
    *F04C 29/02*     (2006.01)

(52) U.S. Cl.
CPC ............ *F04B 39/041* (2013.01); *F04C 29/04* (2013.01); *F16J 15/3404* (2013.01); *F04C 29/02* (2013.01)

(56) References Cited

U.S. PATENT DOCUMENTS

| | | |
|---|---|---|
| 2,500,454 A | 3/1950 | Evans |
| 4,157,834 A | 6/1979 | Burdette |
| 4,389,052 A | 6/1983 | Shimizu et al. |
| 4,471,862 A | 9/1984 | Sugita |
| 4,962,936 A | 10/1990 | Matsushima |
| 5,028,205 A | 7/1991 | Kapadia et al. |
| 5,035,155 A | 7/1991 | Robledo |
| 5,676,221 A | 10/1997 | Renk et al. |
| 5,692,756 A * | 12/1997 | Altieri ................ F16J 15/3496 277/353 |
| 5,806,856 A * | 9/1998 | Black, Jr. ................ F16J 15/43 277/314 |
| 5,899,460 A * | 5/1999 | Altieri ................ F16J 15/3464 277/352 |
| 6,065,755 A | 5/2000 | Fedorovich |
| 6,126,411 A | 10/2000 | Flanigan et al. |
| 6,257,368 B1 | 7/2001 | Young |
| 6,343,794 B1 | 2/2002 | Brown |
| 6,698,232 B1 | 3/2004 | Duppert et al. |
| 7,134,667 B2 | 11/2006 | Weiler |
| 7,748,951 B2 | 7/2010 | Visintainer |
| 7,789,396 B2 | 9/2010 | Takeno et al. |
| 8,146,922 B2 | 4/2012 | Maier et al. |
| 8,376,368 B2 | 2/2013 | Skorucak |
| 2009/0221737 A1 * | 9/2009 | Guy ................ C08K 5/5455 524/493 |
| 2010/0264598 A1 | 10/2010 | Kim et al. |
| 2015/0337964 A1 * | 11/2015 | Kaiser ................ F04B 53/18 277/551 |
| 2016/0116071 A1 * | 4/2016 | Pandzik ................ F04B 1/0448 464/170 |

OTHER PUBLICATIONS

Chinese Office Action issued in corresponding Chinese Application No. 201480026913.9 dated Sep. 5, 2016 (5 pages).
European Search Report issued in corresponding European Application No. 14762434.0 dated Feb. 8, 2017 (9 pages).
Heinz BLOCH: "Lubrication of Compressors and Gas Engines" Machinery Lubrication, Machinery Lubrication, XP001176944, 2003, pp. 24-29.

* cited by examiner

SHAFT SEAL FOR AN OPEN-DRIVE COMPRESSOR

FIELD

This disclosure generally relates to devices for extending the lifespan of an open-drive compressor.

BACKGROUND

A transport refrigeration system (TRS) is generally used to control an environmental condition such as, but not limited to, temperature and/or humidity of a transport unit. Examples of transport units include, but are not limited to, a container on a flat car, an intermodal container, a truck, a boxcar, or other similar transport unit (generally referred to as a "climate controlled transport unit"). A refrigerated transport unit is commonly used to transport perishable items such as, but not limited to, produce, frozen foods, and meat products. Generally, the refrigerated transport unit includes a transport refrigeration unit (TRU) that is attached to a transport unit to control the environmental condition of an interior space within the transport unit. The TRU can include, without limitation, a compressor, a condenser, an expansion valve, an evaporator, and fans or blowers to control the heat exchange between the air inside the interior space and the ambient air outside of the refrigerated transport unit.

In a cooling cycle, a refrigerant is compressed by the compressor and subsequently flows into the condenser. In the condenser, the compressed refrigerant can release heat to the environment. Then the refrigerant can pass through the thermo expansion valve where it can subsequently flow into the evaporator to absorb heat from air in a space desired to be cooled. A fan and/or blower can be used to facilitate heat exchange between the refrigerant and the environment when the refrigerant is in the condenser and the evaporator by creating air flow through the condenser and the evaporator.

SUMMARY

The embodiments disclosed here are directed to methods and devices for extending the lifespan of a shaft seal for an open-drive compressor. Embodiments disclosed herein can maintain lubrication of the shaft seal of an open-drive compressor that is operating in a vacuum condition. Further, the embodiments have an external side of the shaft seal configured to retain a volume of lubricant (e.g., oil).

The shaft seal includes two seal faces that can rotate with respect to each other (e.g., the first face being a part of one or more movable components and the second face being a part of one or more static (non-rotating) components). The lubricant is fed in between the two seal faces to prevent damage to the seal faces as the seal faces rotate with respect to each other.

In prior devices, the shaft seal is intended to work only in positive suction pressure, and the flow of oil is intended to be only outward (from the suction side to the external "ambient side" that is vented to (i.e., open to) the ambient atmosphere). However, in a refrigeration system, the open-drive compressor can intermittently, while running in a continuous operation, be in a compressor suction vacuum condition. When the open-drive compressor is operating under a compressor suction vacuum condition, a negative pressure with respect to the ambient atmospheric pressure can be created inside the housing of the open-drive compressor. In such case, the lubricant which is intended to lubricate the shaft seal can be sucked into the housing of the open-drive compressor and away from the seal faces (e.g., the interface between a moving component and a static component). The removal of the lubricant from the interface can lead to deterioration of the seal faces, thereby reducing the lifespan of the shaft seal and potentially the open-drive compressor. Further, in prior devices, when the pressure inside the housing of the open-drive compressor is greater than the ambient atmospheric pressure outside of the housing, the lubricant used by the shaft seal can cause the lubricant to flow outward from the shaft seal due to the pressure differential, leading to a removal of the lubricant from the interface.

The embodiments of the shaft seal is used to retain pressurized gas and/or lubricant inside a housing of an open-drive compressor. The embodiments of the shaft seal can slow and/or stop the flow of the lubricant away from the seal faces by maintaining a pressure, and by configuring the shaft seal and other components to prevent the lubricant from completely emptying out from the shaft seal under vacuum conditions. Thus, the lubrication in the shaft seal can be maintained to improve the operation of the shaft seal and can also improve the overall operation of the compressor.

The embodiments described herein have an external side of the shaft seal which allow for the external side of the shaft seal to be isolated from the ambient atmosphere. The term "external side" is used herein to describe a side of the shaft seal that is outside of the refrigeration side. The "external side" can also be called an "ambient side" when that side of the shaft seal is open to the ambient atmosphere and is at ambient pressure. In some embodiments, this side of the shaft seal can be sealed (e.g., isolated from the ambient atmosphere) and thus this side can be (or is) at a pressure that is different from the ambient pressure. That is, the external side may not be open to the ambient atmosphere and the pressure at the external side need not be identical to the ambient pressure. Accordingly, the external side has an isolated cavity having a somewhat annular shape surrounding the crankshaft. Herein, the terms external side cavity and the cavity of the external side are used exchangeably. In contrast, the "ambient side" of prior devices is open to the ambient atmosphere so the ambient side has a pressure which is substantially the same as the ambient atmospheric pressure.

The volume of lubricant retained at the shaft seal can be a predetermined volume and/or a predetermined range of volume. That is, the embodiments described herein are configured to maintain a predetermined volume and/or a predetermined range of volumes of lubricant so that the lubricant can be present at an interface between a movable component and a static component at the shaft seal, even under vacuum conditions.

In some embodiments, to provide a vacuum condition in a cavity at the external side, a drain tube can include, for example, a check valve, to slow the flow of lubricant out of the external side when in a vacuum condition.

The embodiments described herein can also reduce and/or prevent deterioration of the shaft seal regardless of the operation condition of the open-drive compressor. The embodiments described herein can further reduce and/or prevent leakage of a lubricant and/or refrigerant that can cause deterioration of components within a TRU.

This disclosure is related to resolving the above issues with the premature deterioration of the shaft seal. Further, this disclosure is related to resolving leakage of lubricant and/or refrigerant that can cause deterioration of other components. Further, this disclosure is related to reducing and/or resolving need to have lubricant sucked into the housing of the compressor from the outside.

BRIEF DESCRIPTION OF THE DRAWINGS

Referring now to drawings, in which like reference numbers represent corresponding or similar parts.

DETAILED DESCRIPTION

Figure 1:
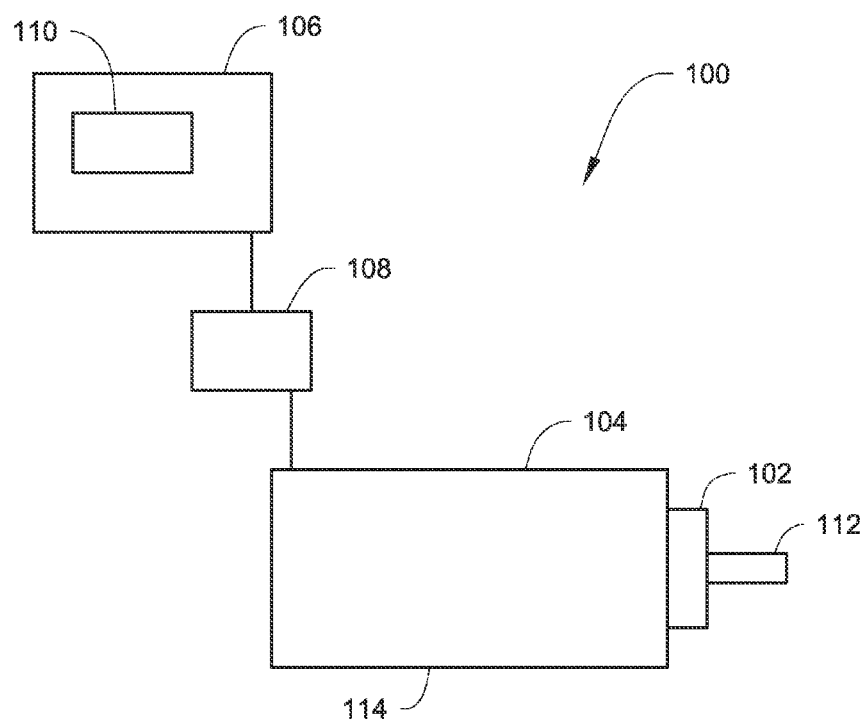
FIG. 1 illustrates a schematic block diagram of a compressor system, according to an embodiment.

A refrigeration unit can carry a load that requires constant delivery of cooled air that is just above the freezing point of water. For example, the load can be produce. In order to maximize the life of the produce and to prevent the produce from freezing, the refrigeration unit may be configured to deliver the cooled air to achieve a temperature set point (e.g., set by a controller that controls the refrigeration unit). When the ambient temperature is the same or close to the temperature set point of the refrigeration unit, little or no refrigeration (e.g., cooled air) is required to keep the load cooled. In a refrigeration unit (and/or system), when the ambient temperature is close to the temperature set point, a refrigerant capacity of the refrigeration unit is reduced via closing a throttling valve to reduce a mass flow of the refrigerant through the refrigeration unit. The closing of the throttling valve can cause a compressor (e.g., an open-drive compressor) of the refrigeration unit to be in a vacuum or a partial vacuum condition (both conditions are referred to herein as a vacuum condition).

For a conventional open-drive compressor, positive suction pressure is beneficial to lubrication of a shaft seal, wherein the positive suction pressure pushes a lubricant (e.g., oil) between faces of the mechanical shaft seal. The conventional open-drive compressor has a seal cover that has a vent and a drain that is connected to a drain tube for directing the lubricant to flow out from the compressor. The flowing lubricant can be collected into a bottle or a container.

The vent and the drain of the seal cover promote the lubricant to flow from the open-drive compressor, pushed by the positive suction pressure. When in a vacuum condition, such as when the throttling valve is closed, the lubricant may not be pushed to the faces of the mechanical shaft seal. Further, the vent and the drain continue to promote draining away of the lubricant out from the shaft seal. Thus, with the conventional open-drive compressor, the mechanical shaft seal may not have adequate lubrication when in a vacuum condition. Without adequate lubrication to the shaft seal, the open-drive compressor and/or the refrigeration unit can fail.

In a real world operational condition, it is possible that an open-drive compressor can be in a vacuum condition for a substantial amount of time (e.g., 90% of the time). Further, such operational conditions might last for several days (e.g., 3-4 days). Accordingly, the conventional open-drive compressor generally can have a maximum operational time in the vacuum condition of before or about 100 hours before failure. In contrast, the embodiments disclosed herein can exceed the 100 hours because the embodiments allow for a vacuum condition to exist and yet can still prevent the lack of adequate lubrication condition at the shaft seal (and/or the metal-on-metal interface of the open-drive compressor).

This disclosure is directed to devices and methods for extending the lifespan of a shaft seal for an open-drive compressor. The embodiments described herein are directed to a compressor system having an open engine/motor drive (also referred to as an open-drive compressor).

More particularly, the embodiments relate to devices for extending the lifespan of a shaft seal for an open-drive compressor by supplying pressurized lubricant (such as oil) in between the face seals of the shaft seal even when the open-drive compressor suction is operating in a compressor suction vacuum condition.

The embodiments of the seal cover further include a lip seal configured to seal the external side of the shaft seal to form the external side cavity around the crankshaft. An embodiment of the lip seal includes a sealant material coating for enhancing the sealing at the external side. To further enhance the sealing and for retaining the lubricant to a certain level at the external side (e.g., cavity of the external side), a drain tube is configured to prevent the flow of lubricant from the external side when in vacuum condition. For example, the drain tube that is connected to the drain hole includes a check valve, which closes when the open-drive compressor is in the vacuum condition. This results in the cavity of the external side becoming sealed to the ambient pressure and being pulled into a deeper vacuum. The deeper vacuum at the cavity of the external side results in a smaller pressure differential across the shaft seal. Therefore, the flow of lubricant from the external side cavity back to the compressor due to a positive suction pressure at the open-drive compressor can be slowed.

The embodiments disclosed herein are directed towards a compressor system including an open-drive compressor that is capable of providing adequate amount of lubricant to a shaft seal of the open-drive compressor, even under a vacuum condition. In particular, the embodiments described herein can maintain lubricant at an external side of the seal cover and can maintain the lubricant so that the interface is lubricated even under a vacuum condition in the cavity of the external side.

In some embodiments, to maintain lubricant at an external side of the seal cover, a seal cover can include a drain channel and a drain inlet (e.g., a drain hole), wherein the configuration of the drain channel and the drain inlet provides a structure in the seal cover so that a certain volume (or height) of lubricant can be retained at an external side (e.g., cavity) of the seal cover. The seal cover has a center opening with an inner surface which can include the lubricant drain channel connected to the cavity of the external side and the drain inlet.

In some embodiments, the seal cover does not have a drain channel. The seal cover includes a drain inlet (e.g., a drain hole), wherein the configuration (e.g., position) of the drain inlet provides a structure in the seal cover so that a certain volume (or height) of lubricant can be retained at an external side (e.g., cavity) of the seal cover.

Also, in some embodiments, to maintain lubricant at an external side of the seal cover, the cavity of the external side of the seal cover can be prefilled with lubricant prior to installation of the open-drive compressor within, for example, a transport refrigeration system. In some embodiments, to provide a vacuum condition in the cavity of the external side, a drain tube can include, for example, a check valve, to slow the flow of lubricant out of the external side when in a vacuum condition. Also, in some embodiments, to provide a vacuum condition in the cavity of the external side, an external side of the seal cover can be provided without a continuously open vent. Further, in some embodiments, to provide a vacuum condition in the cavity of the external side, a lip seal of the seal cover can include a sealant material coating for enhancing the sealing at the external side.

Further, the pressurized external side of the shaft seal prevents draining of the lubricant away from the interface. Thus, the configuration of the shaft seal contributes to the lubricant being maintained at shaft seal (e.g., at the interface). For example, the embodiments are configured so that a volume of lubricant is maintained in the shaft seal so that the lubricant is in contact with at least a portion of the interface in the shaft seal, and yet does not leak through components of the compressor. An example of the volume of lubricant includes enough lubricant volume to cover up to 50% of the arc-length of a cross-section of the interface in the shaft seal with the lubricant. Another example of the volume of lubricant includes enough lubricant volume to cover less than 50% of the arc-length of the cross-section of the interface in the shaft seal with the lubricant. Another example of the volume of lubricant includes enough lubricant volume to cover at least a portion of the arc-length of the cross-section of the interface in the shaft seal with the lubricant. In one embodiment, a method for maintaining pressure differential across the cavity of the external side by sealing the cavity from the ambient atmosphere and maintaining a volume of lubricant in the cavity can be provided, so that when the shaft of the compressor is rotating, at least a portion of the surface of the interface between a moving component and a static component in the cavity is lubricated by the lubricant contained in the cavity.

References are made to the accompanying drawings that form a part hereof, and in which is shown by way of illustration of the embodiments in which the methods and systems described herein may be practiced. Like reference numbers represent corresponding or similar parts.

FIG. 1 illustrates a block diagram of a compressor system 100, according to an embodiment. The compressor system 100 can supply a pressurized lubricant (e.g., oil) to a shaft seal 102 (and/or other moving parts, metal to metal contact parts, etc.) of an open-drive compressor 104. When the pressurized lubricant is supplied to the shaft seal 102, there is a positive suction pressure. When the pressurized lubricant is not being supplied to the shaft seal 102, a reverse pressure differential at the shaft seal 102 is created, which can lead to a vacuum condition. The open-drive compressor 104 and the shaft seal 102 are configured to maintain lubrication at the shaft seal 102 with the lubricant even when operating in the vacuum condition (accordingly, additional pressurized lubricant may not be delivered to the shaft seal 102).

The compressor system 100 includes the embodiment of the open-drive compressor 104. The compressor system 100 can also include a TRS controller 106 that controls an electronic throttle valve (ETV) 108. The TRS controller 106 includes a processor and computer readable medium 110 that is configured to store and execute computer readable instructions for controlling the ETV 108. The ETV 108 can control the amount of pressurized lubricant that is delivered to the open-drive compressor 104 or not.

The open-drive compressor 104 includes a crankshaft 112 (e.g., an open drive shaft) that protrudes out from a shaft seal housing 114 of the open-drive compressor 104. The shaft seal 102 is positioned at a location where the crankshaft 112 meets the housing 114 of the compressor 104.

Figure 2:
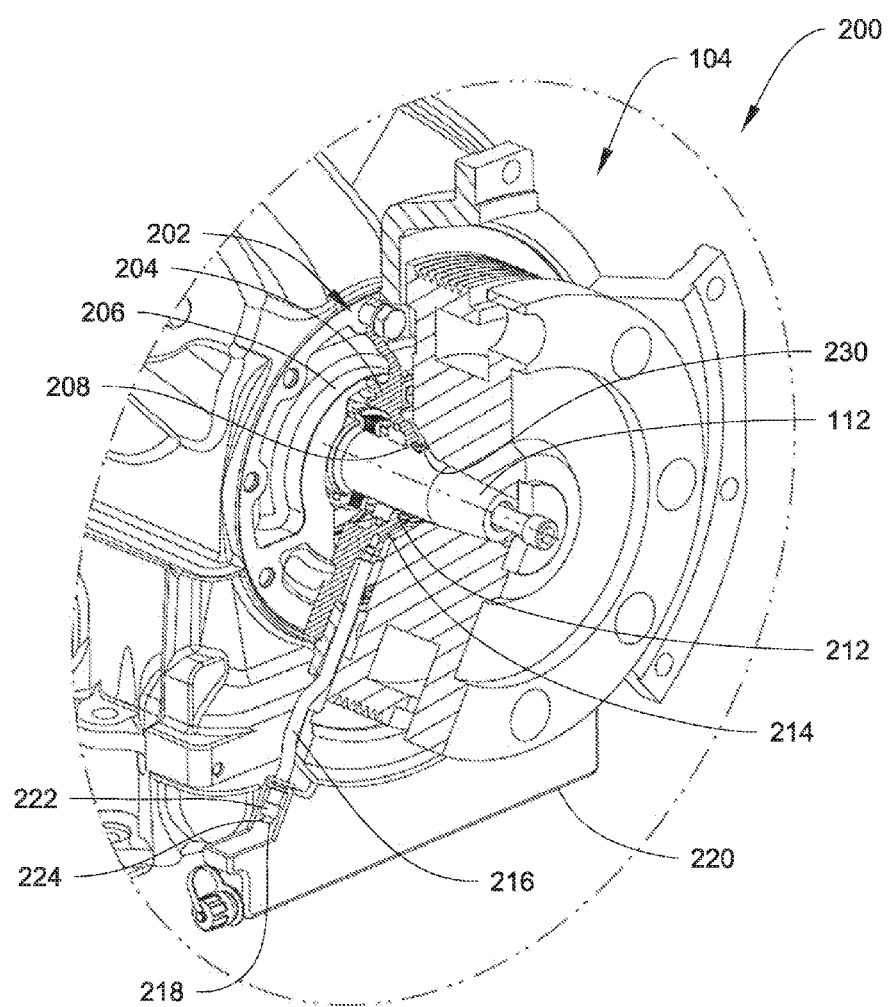
FIG. 2 illustrates a cutaway perspective view of a detailed configuration of one embodiment of the open-drive compressor.
Figure 3:
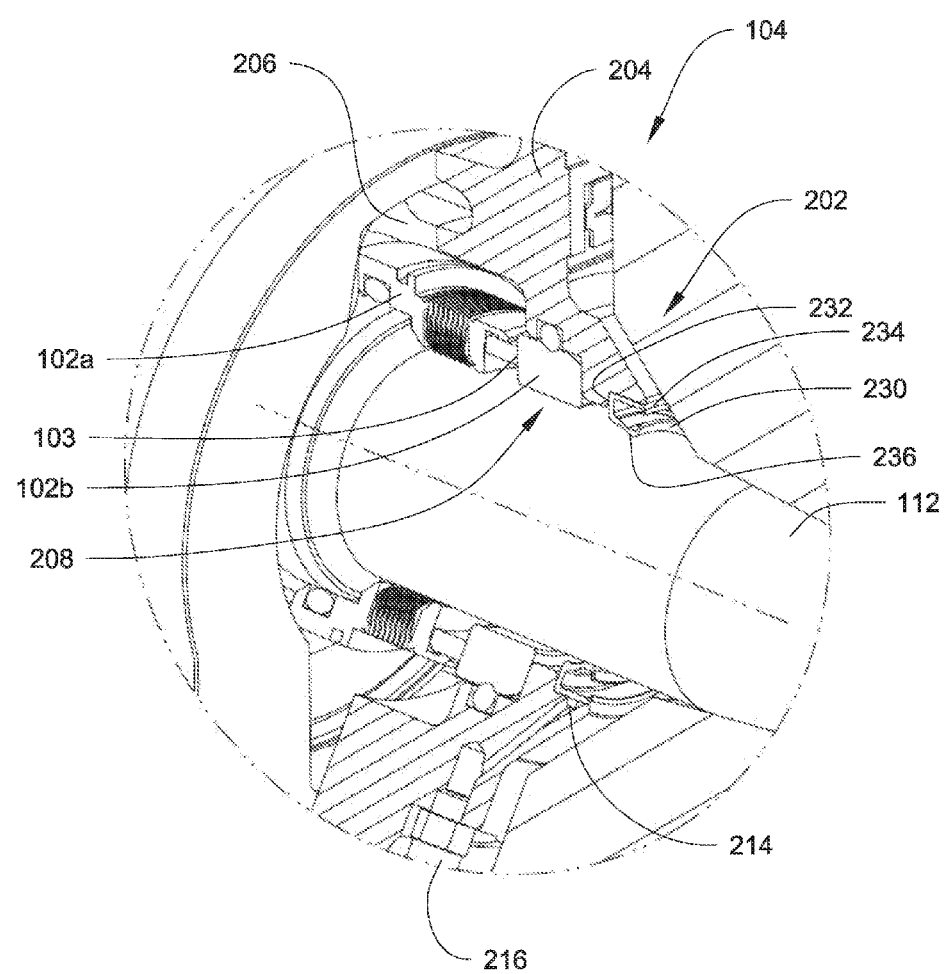
FIG. 3 illustrates a detailed view of the portion of the cutaway view of FIG. 2.
Figure 4:
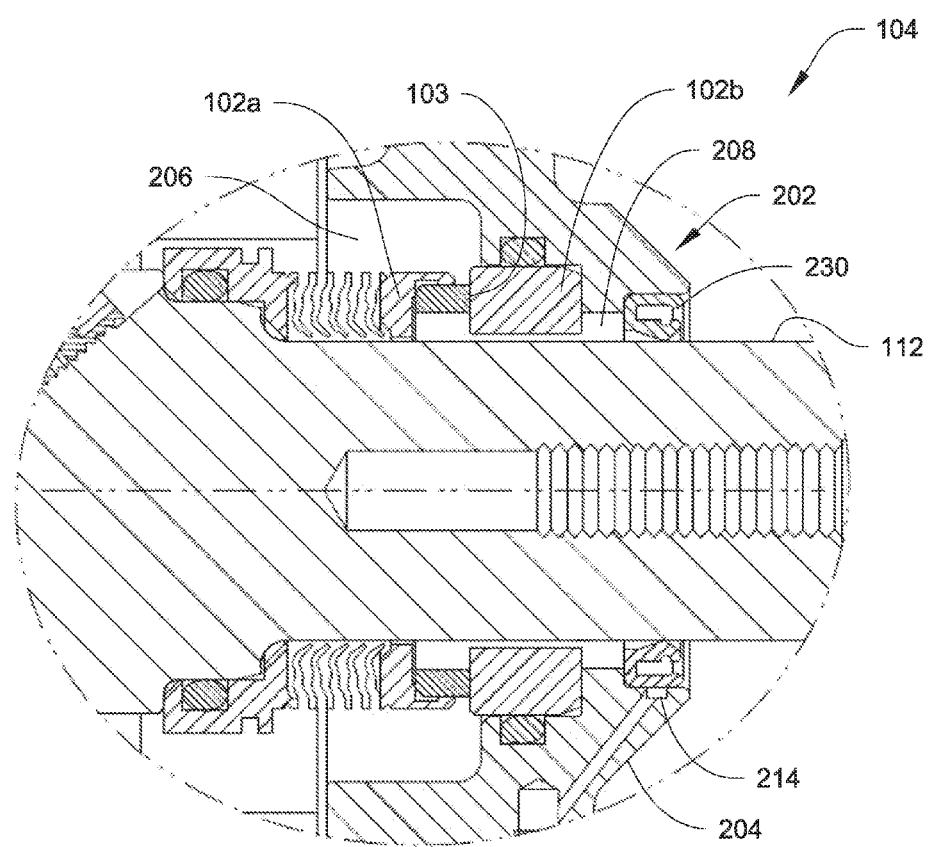
FIG. 4 illustrates a detailed cutaway side view of a portion of the embodiment of FIGS. 2-3.
Figure 5:
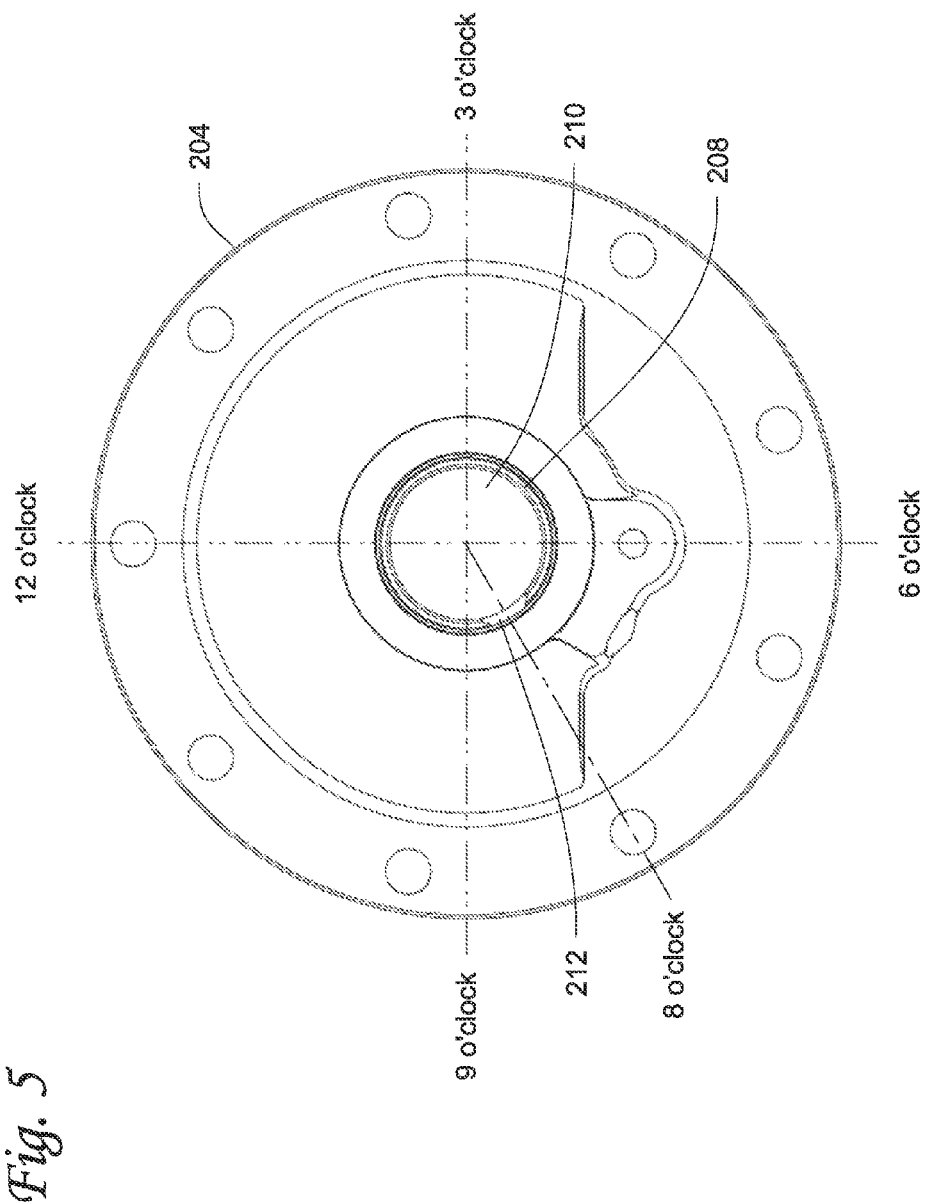
FIG. 5 illustrates a front view of a seal cover, according to an embodiment.
Figure 6:
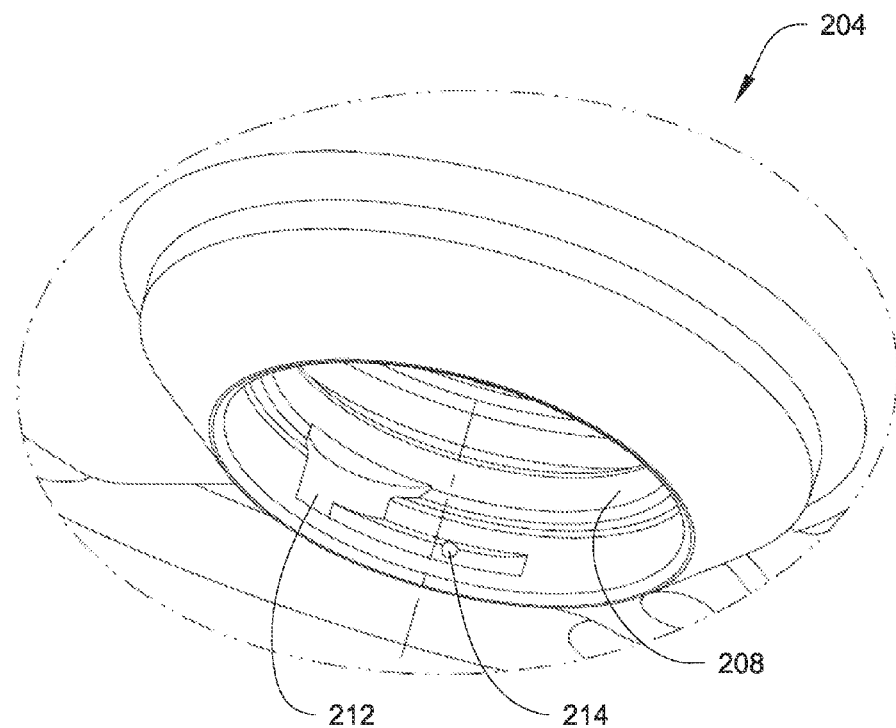
FIG. 6 illustrates a detailed close up perspective view of a portion of the seal cover of FIG. 5.

FIGS. 2-6 illustrate views of an embodiment of the shaft seal 102 for the open-drive compressor 104. FIG. 2 illustrates a partial cutaway perspective view of a portion 200 of the embodiment of the shaft seal 102 of the open-drive compressor 104. FIG. 3 illustrates a close-up perspective cutaway view of the shaft seal 102 of the open-drive compressor 104 shown in FIG. 2. FIG. 4 illustrates a side cutaway view of the shaft seal 102 of the open-drive compressor 104 shown in FIG. 3. FIGS. 5-6 illustrate an embodiment of the seal cover 204.

The cutaway perspective view of the portion 200 illustrates a detailed internal view of the shaft seal 102, which includes a seal cover assembly 202. As shown in FIGS. 3 and 4, the shaft seal 102 includes one or more movable components 102a and one or more static (non-rotating) components 102b meeting together at an interface 103. The interface 103 has seal faces (not shown) that can rotate with respect to each other. The lubricant is fed to the interface 103 to prevent damage to the seal faces as the one or more movable components 102a rotates about the one or more static components 102b.

Referring to FIG. 2, the seal cover assembly 202 includes a seal cover 204 covering and sealing internal mechanical parts of the open-drive compressor 104 and allowing the crankshaft 112 to extend outward through the seal cover 204. The seal cover 204 can be bolted to the housing 114 of the open-drive compressor 104. The seal cover 204 provides for a separation of a suction side 206 and an external side cavity 208 of the shaft seal 102. In this embodiment, the seal cover 204 does not have a continuously open vent to an external side cavity 208. In some embodiments, the structural shape of the cavity defined to be the external side cavity 208 can have a substantially annular shape around the crankshaft 112 (e.g., see FIGS. 3 and 4). The suction side 206 of the shaft seal 102 can provide a positive pressure via providing a pressurized lubricant thereto. The suction side 206 can create a negative suction pressure (e.g., a vacuum condition) when the pressurized lubricant is not provided thereto. Even when there is a vacuum condition, this negative pressure differential across the suction side 206 and the external side cavity 208 does not "dry out" the shaft seal 102 at the interface 103 because of the seal cover 204 is configured to continuously provide adequate amount of lubricant to the interface 103. The seal cover 204 is shaped to receive the crankshaft 112 and allow the crankshaft 112 to penetrate through a center opening 210 (see FIG. 5).

As shown in FIG. 2, the seal cover 204 includes a lubricant drain channel 212 connected to a drain inlet 214. The drain channel 212 can be, for example, a groove formed (e.g., cut into) on an inner surface of the seal cover 204. The drain inlet 214 can be a hole on the surface which is connected to a drain tube 216. For example, the drain channel 212 can be positioned at about the 8 O'clock position of the seal cover (see FIG. 5), and the drain inlet 214 can be positioned at about the 6 O'clock position (see FIG. 6). The overflow of the lubricant from the external side cavity 208 that reaches above the 8 O'clock position can be directed to flow via the drain channel 212 to the drain inlet 214 and away from the external side cavity 208. The "X O'clock" (wherein X is a number) position can be identified by looking at the front face of the seal cover 204. Accordingly, the X O'clock position indicates a position on the front face along a circumferential direction from the top most position being 12 O'clock, and the bottom most being 6 O'clock, and the left most position being 9 O'clock, and the right most position being 3 O'clock. For example, the seal cover 204 shown in FIG. 5 shows few of these X O'clock positions.

The positions and configurations of the drain channel 212 and the drain inlet 214 can vary depending on the height and/or volume of the lubricant that should be maintained at the external side cavity 208. Thus, the lubricant drain channel 212 and a drain inlet 214 can be configured to retain the lubricant at the external side cavity 208 at a predetermined range of volume and/or height. Further, the lubricant drain channel 212 is configured to direct a flow of the lubricant that exceeds a particular lubricant volume and/or height level in the cavity of the external side cavity 208 to the drain inlet 214. When there is a positive pressure of lubricant flowing to the shaft seal 102, the excess lubricant above the lubricant level held by the lubricant drain channel 212 and/or the drain inlet 214 can be pushed away from the center opening 210 through the drain inlet 214. When there is a vacuum condition, the lubricant can be maintained at the lubricant level held by the lubricant drain channel 212 and/or the drain inlet 214, and be prevented from being pushed away from the center opening 210 through the drain inlet 214. The seal cover 204 is configured to be able to have a lubricant level by retaining (and/or storing) a certain amount of lubricant before the lubricant is drained away from the external side of the shaft seal 102 in the external side cavity 208 of the shaft seal 102. When the open-drive compressor 104 operates in a vacuum condition (e.g., a reverse pressure differential), the level of the lubricant on the external side of the shaft seal 102 can provide lubrication of the seal and help prevent seal face damage that can otherwise occur (e.g., due to lack of lubricant). The arrangement of the lubricant drain channel 212 and the drain inlet 214 allows the lubricant to collect at (and/or near) the center opening 210. Thus, the lubricant can be maintained at a higher level (and/or volume) than a conventional drain inlet and/or hole.

Another embodiment of the seal cover can have the lubricant drain channel positioned at a 9 O'clock position. Another embodiment of the seal cover can have the lubricant drain channel positioned at a 10 O'clock position. Another embodiment of the seal cover can have the lubricant drain channel positioned at an 11 O'clock position. Another embodiment of the seal cover can have the lubricant drain channel positioned at a 12 O'clock position. Another embodiment of the seal cover can have the lubricant drain channel positioned at a 1 O'clock position. Another embodiment of the seal cover can have the lubricant drain channel positioned at a 2 O'clock position. Another embodiment of the seal cover can have the lubricant drain channel positioned at a 3 O'clock position. Another embodiment of the seal cover can have the lubricant drain channel positioned at a 4 O'clock position. Another embodiment of the seal cover can have the lubricant drain channel positioned at a 5 O'clock position. Another embodiment of the seal cover can have the lubricant drain channel positioned at a 6 O'clock position. Another embodiment of the seal cover can have the lubricant drain channel positioned at any location from 12 O'clock to 5 O'clock positions. Another embodiment of the seal cover can have the lubricant drain channel positioned at any location from 5 O'clock to 7 O'clock positions. Another embodiment of the seal cover can have the lubricant drain channel positioned at any location from 7 O'clock to 12 O'clock positions. Another embodiment of the seal cover can have the lubricant drain channel positioned at any location from 3 O'clock to 5 O'clock positions. Another embodiment of the seal cover can have the lubricant drain channel positioned at any location from 7 O'clock to 9 O'clock positions. Another embodiment of the seal cover can have the lubricant drain channel positioned at any location in any O'clock position except at the 6 O'clock position.

In an embodiment, the drain inlet can be positioned at any location from 6 O'clock to 10 O'clock position and the lubricant drain channel can be positioned so that the lubricant flows into the lubricant drain channel from an O'clock position that is greater than the position of the drain inlet. For example, when the drain inlet is positioned at the 7 O'clock position, the lubricant drain channel can be positioned so that the lubricant flows into the lubricant drain channel from the 8 O'clock position.

In an embodiment, the drain inlet can be positioned at any location from 2 O'clock to 6 O'clock position and the lubricant drain channel can be positioned so that the lubricant flows into the lubricant drain channel from an O'clock position that is less than the position of the drain inlet. For example, when the drain inlet is positioned at a 5 O'clock position, the lubricant drain channel can be positioned so that the lubricant flow into the lubricant drain channel from a 4 O'clock position.

Referring to FIG. 2, the flow of the lubricant can be directed from the external side cavity 208 to the drain channel 212 to the drain inlet 214 and through the drain tube 216. The drain tube 216 includes a check valve 218. The check valve 218 has a connecting portion 222 which connects to the drain tube 216. The check valve 218 has an open/close section 224 which acts as a pressure differential seal that can open when a pressure of an inside of the drain tube 216 is equal to and/or greater than an opposing pressure outside of the check valve 218. When a pressure of the outside of the check valve 218 is greater than the pressure of the inside of the drain tube 216, the open/close section 224 can close to prevent outflow of the lubricant via the drain tube 216. Accordingly, the check valve 218 can stop and/or slow the drainage of the lubricant out from the external side cavity 208 when there is a vacuum condition. This allows the lubricant to be kept longer at the external side cavity 208 of the shaft seal 102, allowing the lubricant to continue lubricating the open-drive compressor even under a vacuum condition. The vent-less shaft seal 102 assists in the creation of a fast response pressure differential seal at the open/close section 224. Further, the check valve 218 can slow the drainage of the lubricant out from the external side cavity 208. Accordingly, a combination of the vent-less shaft seal 102 and the check valve 218 can slow the drainage of the lubricant out from the external side cavity 208. In other embodiments, the check valve 218 may be configured at a different location along the drain tube 216, rather than at the end of the drain tube 216 (e.g., middle, other end of the drain tube 216 (i.e., the end near the drain inlet 214)). As illustrated in FIG. 2, the drain tube 216 extends into a container 220, and the check valve 218 is also inside the container 220. Accordingly, the lubricant can be drained into the container 220.

The seal cover assembly 202 further includes a lip seal 230 positioned between the center opening 210 of the seal cover 204 and the crankshaft 112, wherein the lip seal 230 seals the external side cavity 208 at the center opening 210 of the seal cover 204. As shown in FIG. 3, the lip seal 230 includes a surface 232 which faces the seal cover 204, an upper lip portion 234 that extends in a direction that is substantially perpendicular to the surface 232 axially away from the seal cover 204 and contacts a portion of the seal cover 204.

For embodiments of the seal cover where the drain inlet is positioned at greater than a 7 O'clock (e.g., 8 O'clock, 9 O'clock, etc.), or less than a 5 O'clock (e.g., 4 O'clock, 3 O'clock, etc.) a drain inlet structure may not be required to retain the lubricant at a higher level (and/or volume) than a conventional seal cover, as long as the configuration and/or arrangement of the drain inlet allows the lubricant to collect at (and/or near) the center opening at a higher level (and/or volume) than a conventional drain hole is capable of.

Figure 7:
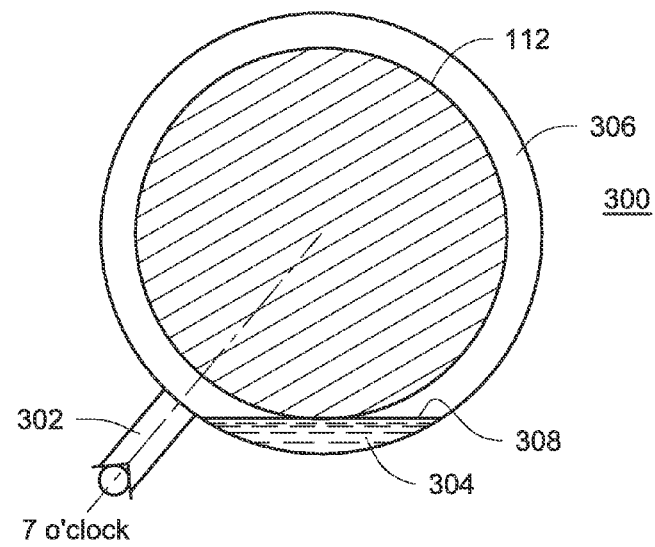
FIG. 7 illustrates a schematic front view of the portion of the seal cover according to an embodiment.

FIG. 7 illustrates a portion of an alternative embodiment, wherein a seal cover 300 has a drain inlet 302 without a lubricant drain channel. The seal cover 300 has the drain inlet 302 positioned at 7 O'clock position so that a sufficient volume (or height 308) of the lubricant 304 can be maintained and/or stored in the external side cavity 306 of the seal cover 300. The volume of lubricant 304 retained in the external side cavity 306 of the shaft seal 300 can be a predetermined amount (e.g., volume and/or height 308). The shaft seal 300 is configured to maintain the predetermined volume (and/or height 308) and/or a predetermined range of volumes (and/or heights) of lubricant 304 so that the lubricant 304 can be present at an interface between a movable component and a static component at the shaft seal 300. That is, the shaft seal 300 having the external side cavity 306 is configured to maintain a minimum volume (and/or height 308) of the lubricant 304 in the external side cavity 306, wherein the minimum volume (and/or height 308) of the lubricant 304 is defined as being an amount of lubricant 304 that lubricates the interface when the crankshaft 112 of the compressor 104 is rotating. Thus, the sufficient height of the lubricant in the external side cavity 306 to be maintained can be a functional ratio of rate of revolution of the crankshaft 112.

In another embodiment, a seal cover can have the drain inlet positioned at a 9 O'clock position. Another embodiment of the seal cover can have the drain inlet positioned at a 10 O'clock position. Another embodiment of the seal cover can have the drain inlet positioned at an 11 O'clock position. Another embodiment of the seal cover can have the drain inlet positioned at a 12 O'clock position. Another embodiment of the seal cover can have the drain inlet positioned at a 1 O'clock position. Another embodiment of the seal cover can have the drain inlet positioned at a 2 O'clock position. Another embodiment of the seal cover can have the drain inlet positioned at a 3 O'clock position. Another embodiment of the seal cover can have the drain inlet positioned at a 4 O'clock position. Another embodiment of the seal cover can have the drain inlet positioned at a 5 O'clock position. Another embodiment of the seal cover can have the drain inlet positioned at any O'clock position except at the 6 O'clock position. Another embodiment of the seal cover can have the drain inlet positioned at any location from 12 O'clock to 5 O'clock positions. Another embodiment of the seal cover can have the drain inlet positioned at any location from 7 O'clock to 12 O'clock positions.

Figure 8:
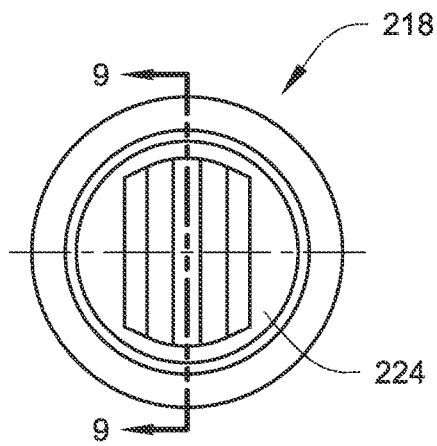
FIG. 8 illustrates an end view of a check valve, according to an embodiment.
Figure 9:
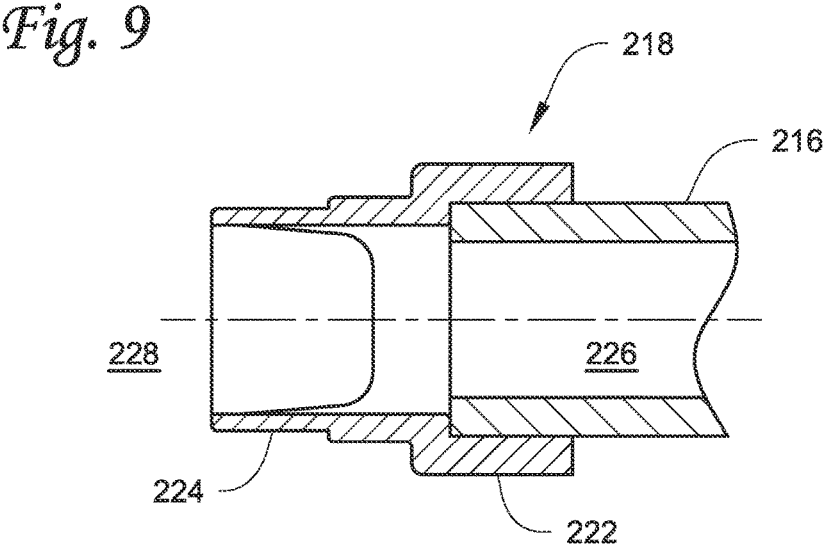
FIG. 9 illustrates a side cutaway view of the check valve of FIG. 8.

FIG. 8 illustrates an end view of the check valve 218 shown in FIGS. 2-6. FIG. 9 illustrates a cross-section of a side view of the check valve 218 (across line 9-9 in FIG. 8). As shown in FIG. 9, the check valve 218 has a connecting portion 222 which connects to the drain tube 216. The check valve 218 has an open/close section 224 which acts as a pressure differential seal that is configured to open when a pressure of an inside 226 of the check valve 218 is equal to and/or greater than an opposing outside 228 of the check valve 218. When a pressure of the outside 228 of the check valve 218 is greater than the pressure of the inside 226 of the check valve 218, the open/close section 224 closes to prevent outflow of the lubricant.

Figure 10:
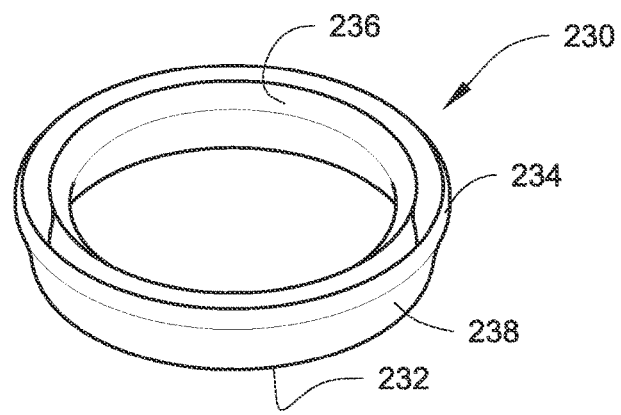
FIG. 10 illustrates a lip seal, according to an embodiment.

FIG. 10 illustrates an embodiment of the lip seal 230. The lip seal 230 includes a surface 232 which faces the seal cover 204, an upper lip portion 234 that extends in a direction that is substantially perpendicular to the surface 232 axially away from the seal cover 204, and contacts a portion of the seal cover 204. The lip seal 230 has a lower lip portion 236 that extends in a direction that is substantially perpendicular to the surface 232 axially away from the seal cover 204, and has a structure configured to contact the crankshaft 112. The upper lip portion 234 and the lower lip portion 236 are configured to further enhance the sealing property of the lip seal 230 by providing a sealing surface 232 closer to the external side cavity 208. The surface 232 is secured by the upper lip 234 and the lower lip 236.

In an embodiment, the lip seal 230 has a sealant material 238 covering at least a portion of any of the surface 232, the upper lip potion 234, and the lower lip portion 236. In an embodiment, the lip seal 230 has a sealant material 238 covering the surface 232 and at least a part of the upper lip potion 234, and/or at least a part of the lower lip portion 236. Examples of the sealant material 238 can include sealant for motor engines, such as an acrylic sealant, SKF Bore Tite Coating, Boresealant, Boreseal™ 59, a compound comprising poly(2-chloro-1,3-butadiene) and titanium dioxide, etc. The sealant material 238 can have a thickness that is appropriate as determined to be needed on the lip seal 230. In one embodiment, the sealant material 238 can have a thickness of 0.03 to 0.07 mm on the lip seal 230. The sealant material 238 can enhance the sealing property of the lip seal 230 by providing one or more sealing bumps on an area of the lip seal 230 that contacts another surface. For example, one or more sealing bumps can be positioned at the upper lip portion 234 that contacts another surface of the open-drive compressor 104 (e.g., near the external side cavity 208). The sealant material 238 can enhance the sealing property of the lip seal 230 by compensating for irregular shapes of the lip seal 230 (e.g., misshapes formed during manufacturing, etc.). Accordingly, the sealant material 238 can enhance the lip seal 230 by correcting for any irregular shapes in the lip seal 230 and by providing bump structures that increases sealing when contacting another surface.

In another embodiment, a lip seal can be provide that does not include sealant material. The lip seal can still be configured to seal and maintain the seal of the cavity of the external side so that the cavity is isolated from the ambient atmosphere.

An embodiment of the open-drive compressor 104 is newly manufactured with a pre-loaded amount of the lubricant at the shaft seal 102. That is, during manufacturing of the open-drive compressor 104, the open-drive compressor 104 can be pre-loaded with the lubricant (such as oil). A lubricant delivery device (e.g., a pressurized delivery device, a syringe-like device, etc.) can be used to provide the lubricant up the drain tube 216 from the end where the check valve 218 would be placed, and the lubricant is pushed into the drain inlet 214 and then into the lubricant drain channel 212. Then, the lubricant delivery device can be removed from the drain tube 216 and the check valve 218 can be placed on the drain tube 216. Because the check valve 218 would be closed due to the vacuum condition that the new open-drive compressor 104 would be in, the lubricant does not leak. That is, the check valve 218 is in a closed state preventing the pre-loaded lubricant from draining away. The external side cavity 208 can be pre-loaded with the lubricant prior to the open-drive compressor 104 being fully operational as a refrigeration unit. Thus, when the open-drive compressor 104 is operated for the first time, the shaft seal 102 can immediately be lubricated by the pre-loaded lubricant. This can greatly reduce virgin failure rate of the open-drive compressor 104.

The method for preloading the lubricant in the external side cavity 208 of the shaft seal 102 during assembly so that the lubricant is pre-loaded in an external side cavity can include the steps of: opening a portion the lip seal to allow for venting of gases from the external side cavity to the atmosphere; introducing the lubricant to flow up the lubricant drain and into the external side cavity, and venting the gases from the external side cavity to the atmosphere as the lubricant flows into the external side cavity; and closing the portion of the lip seal and sealing the external side cavity from the atmosphere.

Each of the above features of the open-drive compressor can affect the functionality and/or performance of the other features. Accordingly, a combination of the above features can lead to an advantage that is greater than mere sum of the individual features.

Figure 11:
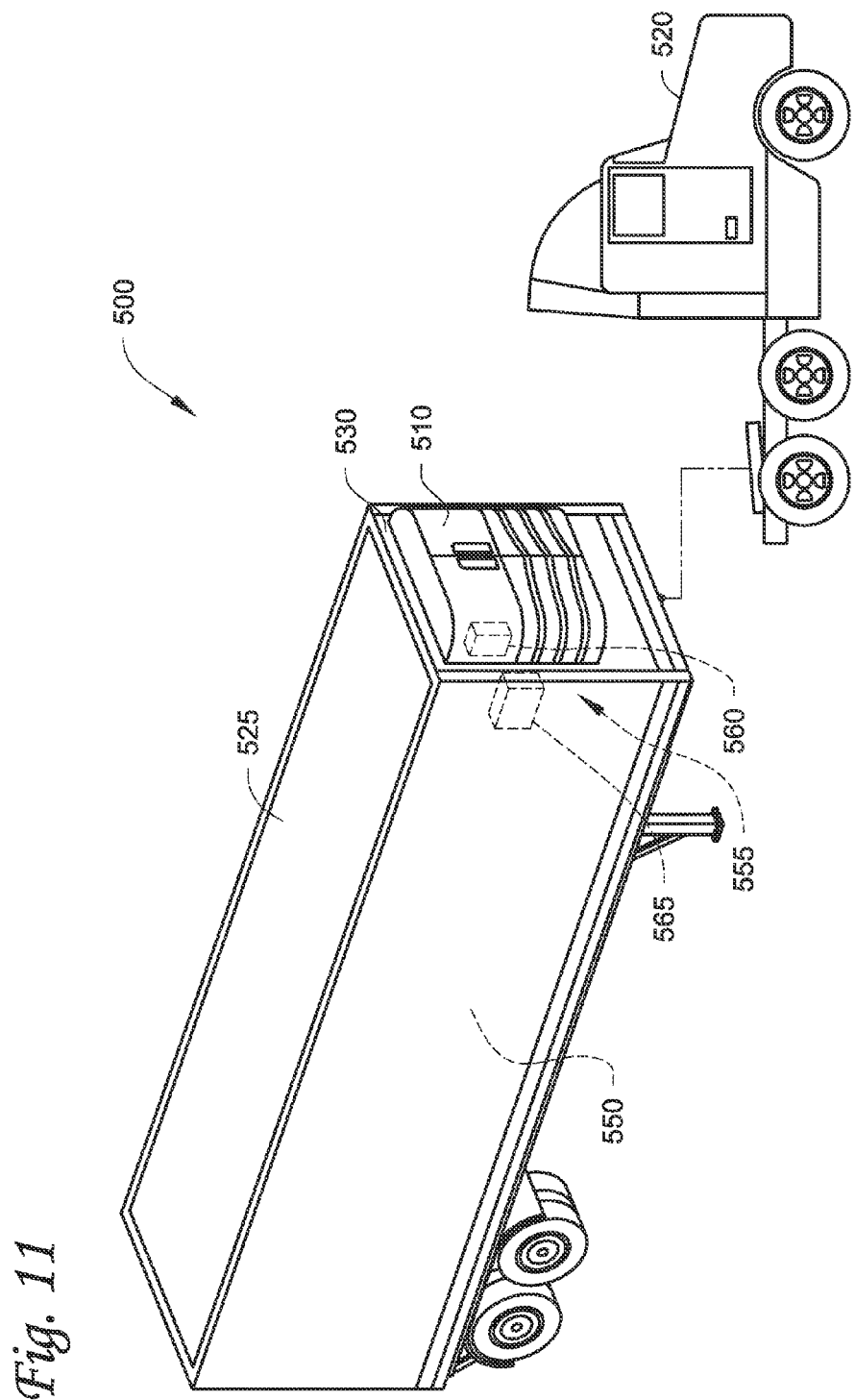
FIG. 11 illustrates an embodiment of a TRS comprising a TRU.

FIG. 11 illustrates one embodiment of a TRS 500 for a transport unit (TU) 525 that is attached to a tractor 520. The TRS 500 includes a TRU 510 that controls refrigeration within an internal space 550 of the TU 525. The TRU 510 is disposed on a front wall 530 of the TU 525. The tractor 520 is attached to and is configured to tow the transport unit 525. It will be appreciated that the embodiments described herein are not limited to trucks and trailer units, but can just as easily apply to any other suitable temperature controlled apparatuses such as a ship board container, an air cargo container or cabin, an over the road truck cabin, among others. The TRS 500 may further comprise a programmable TRS controller 555 that may comprise a single integrated control unit 560 or that may comprise a distributed network of control elements 560, 565. The number of distributed control elements in a given network will depend upon the particular application of the principles described herein. The TRS 500 and/or the TRU 510 can include the compressor system 100 having the structures (e.g., the shaft seal 102) shown in FIGS. 1-10.

Figure 12:
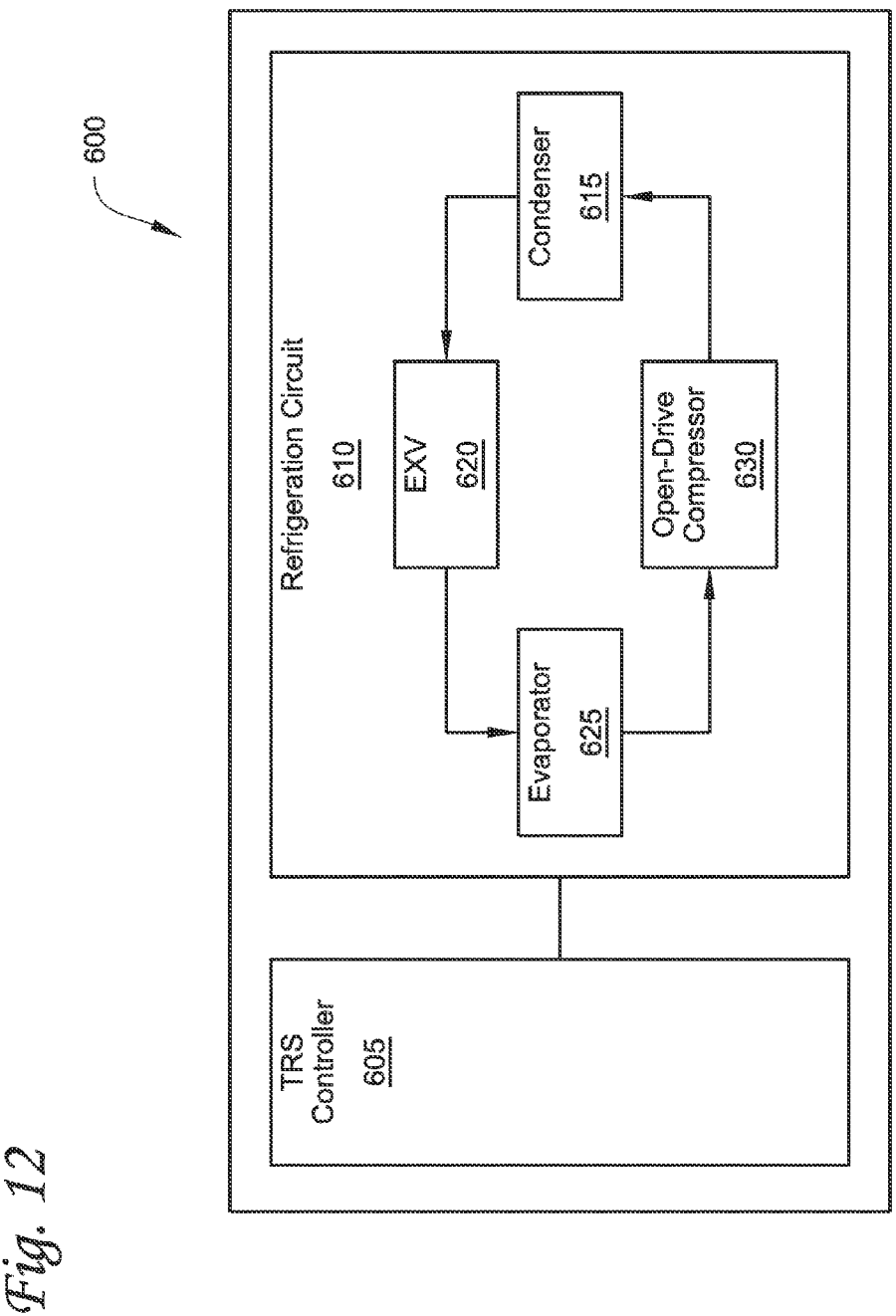
FIG. 12 illustrates a block diagram of a TRU.

FIG. 12 illustrates a non-limiting block diagram of several components within a TRU 600, according to one embodiment, which can be included in the TRS 500 shown in FIG. 11. The TRU 600 includes a TRS Controller 605 and a refrigeration circuit 610. The TRS Controller 605 is connected to and configured to control the refrigerant circuit 610. The TRS Controller 605 controls the refrigeration circuit 610 to obtain various operating conditions (e.g., temperature, humidity, etc.) of an internal space (e.g., the internal space 550 shown in FIG. 11) of a transport unit and can be powered by a genset (not shown) of the TRS and/or another power source (not shown) (e.g., a battery). The refrigeration circuit 610 regulates various operating conditions (e.g., temperature, humidity, etc.) of the internal space based on instructions received from the TRS Controller 605. The refrigeration circuit 310 includes a condenser 615, an expansion valve (EXV) 620, an evaporator 625 and an open-drive compressor 630 that together cool the internal space and any perishable cargo contained therein. The refrigeration circuit 610 can also include an electronic throttle valve (ETV) (not shown) that is configured to control the amount of refrigerant that flows to the open-drive compressor. The TRU 600 can include the compressor system 100 having the structures (e.g., the shaft seal 102) shown in FIGS. 1-10.

Aspects:

It is noted that any of the features in any of the aspects below can be combined with any of the other aspects.

1. A seal cover assembly for a compressor of a refrigeration unit, comprising:

a seal cover configured to separate a suction side cavity of a shaft seal from an external side cavity of the shaft seal and configured to maintain a volume of lubricant within the seal cover during a vacuum condition.

2. The seal cover assembly as in aspect 1, wherein the seal cover includes:

a center opening; and an inner surface facing the center opening, the inner surface including a lubricant drain channel connected to a drain hole, the lubricant drain channel being configured to maintain a volume of lubricant in the external side cavity so that only lubricant above the volume is directed to flow to the drain hole.

3. The seal cover assembly as in any of aspects 1-2, wherein the seal cover includes:

a center opening; and an inner surface facing the center opening, the inner surface including a drain inlet, the drain inlet being configured to maintain a volume of lubricant in the external side cavity so that only lubricant above the volume is directed to flow through the drain inlet.

4. The seal cover assembly as in any of aspects 1-3, wherein the seal cover does not have a continuously open vent to the ambient atmosphere.

5. The seal cover assembly as in any of aspects 1-4, further comprising a lip seal for sealing the cavity, the cavity being disposed around a crankshaft of the compressor, the lip seal including an upper lip portion extending along an axial direction of the crankshaft away from the cavity.

6. The seal cover assembly as in aspect 5, wherein at least a part of the lip seal includes a sealant material coating.

7. The seal cover assembly as in aspect 6, wherein the sealant material coating includes poly(2-chloro-1,3-butadiene).

8. The seal cover assembly as in in any of aspects 1-6, further comprising a drain tube connected to the external side cavity, wherein the drain tube includes a check valve for slowing a flow of the lubricant out of the external side cavity when in a vacuum condition.

9. A seal cover assembly for a compressor of a refrigeration unit, comprising:

a seal cover configured to separate a suction side of a shaft seal from an external side of the shaft seal, and configured to seal a cavity on the external side cavity to maintain a pressure differential across the cavity and an ambient atmosphere.

10. The seal cover assembly as in aspect 9, wherein the seal cover does not have a continuously open vent to the ambient atmosphere.

11. The seal cover assembly as in any of aspects 9-10, further comprising a lip seal for sealing the cavity, the cavity being disposed around a crankshaft of the compressor, the lip seal including an upper lip portion extending along an axial direction of the crankshaft away from the cavity.

12. The seal cover assembly as in aspect 11, wherein at least a part of the lip seal includes a sealant material coating.

13. The seal cover assembly as in aspect 12, wherein the sealant material coating includes poly(2-chloro-1,3-butadiene).

14. The seal cover assembly as in any of aspects 12-13, wherein the sealant material coating includes titanium dioxide.

15. The seal cover assembly as in any of aspects 12-14, wherein the sealant material coating has a thickness range of 0.03 to 0.07 mm.

16. The seal cover assembly as in any of aspects 9-15, further comprising a drain tube connected to the external side cavity, wherein the drain tube includes a check valve for slowing a flow of the lubricant out of the external side cavity when in a vacuum condition.

17. An open-drive compressor for maintaining lubrication of a shaft seal with a lubricant even when operating in a vacuum condition, comprising:
the seal cover assembly as in any of the preceding claims 1-16.

18. The open-drive compressor as in aspect 17, wherein the lubricant is maintained at the seal cover and/or in the drain tube when operating in a vacuum condition.

19. A method for preloading a lubricant in a cavity of an external side of a shaft seal of a compressor during assembly of the compressor so that the lubricant is pre-loaded in the cavity, comprising:
opening a portion a lip seal to allow for venting of gases from the cavity to an ambient atmosphere;
introducing the lubricant to flow up a lubricant drain into the cavity and venting the gases from the cavity to the ambient atmosphere as the lubricant flows into the cavity; and
closing the portion of the lip seal and sealing the cavity from the ambient atmosphere so that a pressure differential between the cavity and the ambient atmosphere can be provided.

20. The method according to aspect 19, further comprising:
retaining a volume of the lubricant in the cavity, wherein the cavity is configured to retain a predetermined range of volume of the lubricant so that even before the closing step, the lubricant is maintained in the cavity.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A seal cover assembly for a compressor of a refrigeration unit, comprising:
a seal cover configured to separate a suction side of a shaft seal from an external side cavity of the shaft seal and configured to maintain a volume of lubricant within the seal cover during a vacuum condition, wherein the seal cover includes:
a center opening; and
an inner surface facing the center opening,
the inner surface including a lubricant drain channel connected to a drain hole, the drain hole configured to drain the lubricant away from the center opening, the lubricant drain channel being configured to maintain a volume of lubricant in the external side cavity so that only lubricant above the volume is directed to flow to the drain hole and away from the center opening.

2. The seal cover assembly as in claim 1, wherein the seal cover does not have a continuously open vent to the ambient atmosphere.

3. The seal cover assembly as in claim 1, further comprising a lip seal for sealing the cavity, the cavity being disposed around a crankshaft of the compressor, the lip seal including an upper lip portion extending along an axial direction of the crankshaft away from the cavity.

4. The seal cover assembly as in claim 3, wherein at least a part of the lip seal includes a sealant material coating.

5. The seal cover assembly as in claim 4, wherein the sealant material coating includes poly(2-chloro-1,3-butadiene).

6. The seal cover assembly as in claim 4, wherein the sealant material coating includes titanium dioxide.

7. The seal cover assembly as in claim 4, wherein the sealant material coating has a thickness range of 0.03 to 0.07 mm.

8. The seal cover assembly as in claim 1, further comprising:
a drain tube connected to the external side cavity, wherein the drain tube includes a check valve for slowing a flow of the lubricant out of the external side cavity when in a vacuum condition.

9. The seal cover assembly of claim 1, wherein the lubricant drain channel includes a groove cut into the inner surface facing the center opening, wherein the groove runs along a circumferential direction of the inner surface.

10. A seal cover assembly for a compressor of a refrigeration unit, comprising:
a seal cover configured to separate a suction side of a shaft seal from an external side cavity of the shaft seal and configured to maintain a volume of lubricant within the seal cover during a vacuum condition, wherein the seal cover includes:
a center opening; and
an inner surface facing the center opening,
the inner surface including a drain inlet, the drain inlet being configured to maintain a volume of lubricant in the external side cavity so that only lubricant above the volume is directed to flow through the drain inlet and away from the center opening.

11. The seal cover assembly as in claim 10, wherein the drain inlet is positioned at any location from 12 O'clock to 5 O'clock positions to maintain the volume of lubricant within the seal cover.

12. The seal cover assembly as in claim 10, wherein the drain inlet is positioned at any location from 7 O'clock to 12 O'clock positions to maintain the volume of lubricant within the seal cover.

13. The seal cover assembly as in claim 10, wherein the drain inlet is positioned at 7 O'clock position to maintain the volume of lubricant within the seal cover.

14. The seal cover assembly as in claim 10, wherein the drain inlet is positioned at 5 O'clock position to maintain the volume of lubricant within the seal cover.

15. The seal cover assembly as in claim 10, wherein the inner surface does not include a drain channel.

16. The seal cover assembly as in claim 10, further comprising a lip seal for sealing the cavity, the cavity being disposed around a crankshaft of the compressor, the lip seal including an upper lip portion extending along an axial direction of the crankshaft away from the cavity.

17. The seal cover assembly as in claim 16, wherein at least a part of the lip seal includes a sealant material coating.

18. The seal cover assembly as in claim 17, wherein the sealant material coating includes poly(2-chloro-1,3-butadiene).

19. The seal cover assembly as in claim 17, wherein the sealant material coating includes titanium dioxide.

20. The seal cover assembly as in claim 17, wherein the sealant material coating has a thickness range of 0.03 to 0.07 mm.

* * * * *